(12) United States Patent
Steen et al.

(10) Patent No.: US 11,679,349 B2
(45) Date of Patent: *Jun. 20, 2023

(54) SINGLE PASS TANGENTIAL FLOW FILTRATION SYSTEMS AND TANGENTIAL FLOW FILTRATION SYSTEMS WITH RECIRCULATION OF RETENTATE

(71) Applicant: EMD Millipore Corporation, Burlington, MA (US)

(72) Inventors: Jonathan Steen, Worcester, MA (US); Mikhail Kozlov, Lexington, MA (US); Herbert Lutz, Playa del Ray, CA (US); Joseph Parrella, Westford, MA (US); Elizabeth M. Goodrich, Bedford, MA (US); Bala Raghunath, Bangalore (IN)

(73) Assignee: EMD Millipore Corporation, Burlington, MA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/315,721

(22) Filed: May 10, 2021

(65) Prior Publication Data

US 2021/0260504 A1  Aug. 26, 2021

Related U.S. Application Data

(60) Continuation of application No. 16/208,018, filed on Dec. 3, 2018, now Pat. No. 11,033,839, which is a
(Continued)

(51) Int. Cl.
*B01D 29/90* (2006.01)
*B01D 61/14* (2006.01)
(Continued)

(52) U.S. Cl.
CPC .......... *B01D 29/908* (2013.01); *B01D 29/52* (2013.01); *B01D 29/603* (2013.01);
(Continued)

(58) Field of Classification Search
CPC .... B01D 29/908; B01D 29/52; B01D 29/603; B01D 61/145; B01D 61/146;
(Continued)

(56) References Cited

U.S. PATENT DOCUMENTS 3,540,595 A  11/1970 Edwards
3,926,811 A  12/1975 Ramsteck
(Continued)

FOREIGN PATENT DOCUMENTS

CN  1054379 A  9/1991
CN  1274298 A  11/2000
(Continued)

OTHER PUBLICATIONS

U.S. Appl. No. 16/280,018, filed Dec. 3, 2018, Pending.
(Continued)

*Primary Examiner* — Krishnan S Menon
(74) *Attorney, Agent, or Firm* — EMD Millipore Corporation

(57) ABSTRACT

A method of filtering a liquid feed is described, comprising passing a liquid feed through a single pass tangential flow filtration (SPTFF) system and recovering the retentate and permeate from the system in separate containers. A method of filtering a liquid feed is also described comprising passing a liquid feed through a tangential flow filtration (TFF) system, recovering permeate and a portion of the retentate from the system in separate containers without recirculation through the TFF system, and recirculating the remainder of the retentate through the TFF system at least once. The methods of the invention can be performed using an SPTFF or a TFF system that comprises manifold segments to serialize the flow path of the feed and retentate without requiring diverter plates.

13 Claims, 9 Drawing Sheets

Related U.S. Application Data division of application No. 14/839,779, filed on Aug. 28, 2015, now Pat. No. 10,195,550.

(60) Provisional application No. 62/043,811, filed on Aug. 29, 2014.

(51) Int. Cl.
   *B01D 63/08* (2006.01)
   *B01D 29/52* (2006.01)
   *B01D 29/60* (2006.01)

(52) U.S. Cl.
   CPC ......... *B01D 61/145* (2013.01); *B01D 61/146* (2022.08); *B01D 61/147* (2013.01); *B01D 63/082* (2013.01); B01D 2313/105 (2013.01); B01D 2313/125 (2013.01); B01D 2313/21 (2013.01); B01D 2315/10 (2013.01); B01D 2315/16 (2013.01); B01D 2319/022 (2013.01)

(58) Field of Classification Search
   CPC ................ B01D 61/147; B01D 63/082; B01D 2313/105; B01D 2313/125; B01D 2313/21; B01D 2315/10; B01D 2315/16; B01D 2319/022

See application file for complete search history.

(56) References Cited

U.S. PATENT DOCUMENTS

| | | |
|---|---|---|
| 3,931,014 A | 1/1976 | Heimbach et al. |
| 4,028,250 A | 6/1977 | Loft |
| 4,222,874 A | 9/1980 | Connelly |
| 4,756,835 A | 7/1988 | Wilson |
| 4,765,906 A | 8/1988 | Downing et al. |
| 4,956,085 A | 9/1990 | Kopf |
| D325,070 S | 3/1992 | Kopf |
| 5,114,582 A | 5/1992 | Sandstrom et al. |
| D327,313 S | 6/1992 | Kopf |
| 5,147,542 A | 9/1992 | Proulx |
| 5,310,688 A | 5/1994 | Zale et al. |
| D357,059 S | 4/1995 | Kopf |
| 5,470,468 A | 11/1995 | Colby |
| 5,538,642 A | 7/1996 | Solie |
| 5,599,447 A | 2/1997 | Pearl et al. |
| 5,654,025 A | 8/1997 | Raghunath et al. |
| 5,685,990 A | 11/1997 | Saugmann et al. |
| 6,139,746 A | 10/2000 | Kopf |
| 6,294,090 B1 | 9/2001 | Nussbaumer et al. |
| 6,362,395 B1 | 3/2002 | Poovaiah et al. |
| 6,365,395 B1 | 4/2002 | Antoniou |
| 6,375,848 B1 | 4/2002 | Cote et al. |
| 6,387,270 B1 | 5/2002 | Van Reis |
| 6,402,956 B1 | 6/2002 | Andou et al. |
| 6,596,172 B1 | 7/2003 | Kopf |
| 6,926,833 B2 | 8/2005 | Van Reis |
| 7,101,561 B2 | 9/2006 | Maertens et al. |
| 7,384,549 B2 | 6/2008 | De et al. |
| 7,531,632 B2 | 5/2009 | Perreault |
| 7,682,511 B2 | 3/2010 | De et al. |
| 7,959,805 B2 | 6/2011 | Chisholm et al. |
| 7,967,987 B2 | 6/2011 | De et al. |
| D651,280 S | 12/2011 | Okawa et al. |
| D655,779 S | 3/2012 | Honda et al. |
| D655,780 S | 3/2012 | Honda et al. |
| 8,157,999 B2 | 4/2012 | De et al. |
| 8,231,787 B2 | 7/2012 | Mir et al. |
| 8,506,802 B1 | 8/2013 | De |
| 8,728,315 B2 | 5/2014 | De Los Reyes et al. |
| 8,747,669 B1 | 6/2014 | Bonner et al. |
| D711,500 S | 8/2014 | Marchetti |
| 8,991,027 B2 | 3/2015 | Jons et al. |
| D729,897 S | 5/2015 | Ledbetter et al. |
| 9,133,433 B2 | 9/2015 | Vogel et al. |
| D741,983 S | 10/2015 | Mueller et al. |
| D761,381 S | 7/2016 | Natale et al. |
| D762,811 S | 8/2016 | Natale et al. |
| D811,519 S | 2/2018 | Natale et al. |
| 10,195,550 B2 | 2/2019 | Steen et al. |
| 10,207,225 B2 | 2/2019 | Lutz et al. |
| 10,350,518 B2 | 7/2019 | Steen et al. |
| D857,839 S | 8/2019 | Natale et al. |
| 10,399,039 B2 | 9/2019 | Steen |
| 10,550,148 B2 | 2/2020 | Natarajan et al. |
| D912,765 S | 3/2021 | Natale et al. |
| 11,033,839 B2 | 6/2021 | Steen et al. |
| 11,040,310 B2 | 6/2021 | Lutz et al. |
| 11,278,827 B2 | 3/2022 | Steen et al. |
| 2002/0170859 A1 | 11/2002 | Kopf |
| 2002/0177693 A1 | 11/2002 | Lebing et al. |
| 2003/0066794 A1 | 4/2003 | Diel |
| 2003/0111402 A1 | 6/2003 | Baig et al. |
| 2004/0167320 A1 | 8/2004 | Couto et al. |
| 2005/0184008 A1 | 8/2005 | Schacht et al. |
| 2005/0197496 A1 | 9/2005 | Perreault |
| 2005/0218057 A1 | 10/2005 | Ngee |
| 2006/0051347 A1 | 3/2006 | Winter |
| 2006/0144788 A1 | 7/2006 | Cath et al. |
| 2006/0219635 A1 | 10/2006 | Mccague et al. |
| 2007/0138082 A1 | 6/2007 | Connors, Jr. et al. |
| 2007/0151925 A1 | 7/2007 | De et al. |
| 2007/0173638 A1 | 7/2007 | Buchacher et al. |
| 2007/0246406 A1 | 10/2007 | Dibel et al. |
| 2008/0087594 A1 | 4/2008 | Hermann et al. |
| 2008/0087595 A1 | 4/2008 | Hermann |
| 2008/0135500 A1 | 6/2008 | Gagnon et al. |
| 2008/0190836 A1 | 8/2008 | Beppu et al. |
| 2008/0202242 A1 | 8/2008 | Mickols et al. |
| 2009/0145838 A1 | 6/2009 | Knappe et al. |
| 2009/0214522 A1 | 8/2009 | Winter |
| 2009/0221047 A1 | 9/2009 | Schindler et al. |
| 2009/0266756 A1 | 10/2009 | Fischer-fruehholz et al. |
| 2010/0006495 A1 | 1/2010 | Buschmann |
| 2010/0111378 A1 | 5/2010 | Kwan |
| 2010/0192976 A1 | 8/2010 | Lee et al. |
| 2011/0005984 A1 | 1/2011 | Boettcher et al. |
| 2011/0309018 A1 | 12/2011 | Kopf et al. |
| 2012/0077963 A1 | 3/2012 | Hongo et al. |
| 2012/0122076 A1 | 5/2012 | Lau et al. |
| 2012/0160758 A1 | 6/2012 | Beauchamp et al. |
| 2012/0166332 A1 | 6/2012 | Naaman |
| 2012/0168368 A1 | 7/2012 | De et al. |
| 2012/0264948 A1 | 10/2012 | Hilbert et al. |
| 2012/0298578 A1 | 11/2012 | Herrington et al. |
| 2012/0316323 A1 | 12/2012 | Nardini et al. |
| 2013/0037486 A1 | 2/2013 | Sayer et al. |
| 2013/0101797 A1 | 4/2013 | Dontula et al. |
| 2013/0146531 A1 | 6/2013 | Tayalia et al. |
| 2013/0334128 A1 | 12/2013 | Takagi et al. |
| 2014/0048483 A1 | 2/2014 | Maeda et al. |
| 2014/0130963 A1 | 5/2014 | Jons et al. |
| 2014/0231331 A1 | 8/2014 | De Los Reyes et al. |
| 2014/0251896 A1 | 9/2014 | Hirozawa et al. |
| 2015/0093800 A1 | 4/2015 | Mahajan et al. |
| 2015/0144560 A1 | 5/2015 | Taniguchi et al. |
| 2015/0360180 A1 | 12/2015 | Lutz et al. |
| 2015/0361129 A1 | 12/2015 | Natarajan et al. |
| 2015/0375173 A1 | 12/2015 | Steen |
| 2016/0059159 A1 | 3/2016 | Steen et al. |
| 2016/0059160 A1 | 3/2016 | Steen et al. |
| 2016/0090514 A1 | 3/2016 | Wang et al. |
| 2017/0056825 A1 | 3/2017 | Schwan et al. |
| 2017/0157566 A1 | 6/2017 | Gefroh et al. |
| 2018/0078903 A1 | 3/2018 | Hillier |
| 2019/0099702 A1 | 4/2019 | Steen et al. |
| 2019/0099716 A1 | 4/2019 | Lutz et al. |
| 2019/0099717 A1 | 4/2019 | Lutz et al. |
| 2019/0134569 A1 | 5/2019 | Steen |
| 2019/0153027 A1 | 5/2019 | Natarajan et al. |
| 2019/0282937 A1 | 9/2019 | Steen et al. |
| 2019/0282963 A1 | 9/2019 | Steen |
| 2020/0246761 A1 | 8/2020 | Wohlleben et al. |

(56) References Cited

U.S. PATENT DOCUMENTS

| | | |
|---|---|---|
| 2020/0368646 A1 | 11/2020 | Salbaum et al. |
| 2022/0176278 A1 | 6/2022 | Steen et al. |
| 2022/0212146 A1 | 7/2022 | Steen et al. |

FOREIGN PATENT DOCUMENTS

| | | |
|---|---|---|
| CN | 103429308 A | 12/2013 |
| CN | 105435504 A | 3/2016 |
| EP | 0307047 A1 | 3/1989 |
| EP | 0613724 A2 | 9/1994 |
| EP | 1029583 A1 | 8/2000 |
| EP | 1707254 A1 | 10/2006 |
| EP | 1944076 A1 | 7/2008 |
| EP | 1974801 A2 | 10/2008 |
| EP | 2067522 A1 | 6/2009 |
| EP | 2119492 A1 | 11/2009 |
| EP | 2682168 A1 | 1/2014 |
| EP | 2703066 A1 | 3/2014 |
| EP | 2735357 A1 | 5/2014 |
| JP | 54-149384 A | 11/1979 |
| JP | 55-109407 A | 8/1980 |
| JP | 5-51435 U | 7/1993 |
| JP | 2000-288541 A | 10/2000 |
| JP | 2001-252543 A | 9/2001 |
| JP | 2006-247453 A | 9/2006 |
| JP | 2008-23415 A | 2/2008 |
| JP | 2009-178915 A | 8/2009 |
| JP | 2010-53154 A | 3/2010 |
| JP | 2013-240765 A | 12/2013 |
| JP | 5606615 B1 | 10/2014 |
| JP | 2015-9182 A | 1/2015 |
| JP | 2015-107467 A | 6/2015 |
| KR | 30-0646879 S | 5/2012 |
| WO | 91/11249 A1 | 8/1991 |
| WO | 00/48703 A1 | 8/2000 |
| WO | 2005/054287 A1 | 6/2005 |
| WO | 2006/105555 A1 | 10/2006 |
| WO | 2007/076496 A2 | 7/2007 |
| WO | 2007/076497 A2 | 7/2007 |
| WO | 2009/035700 A2 | 3/2009 |
| WO | 2009/064797 A2 | 5/2009 |
| WO | 2011/094236 A2 | 8/2011 |
| WO | 2012/039675 A1 | 3/2012 |
| WO | 2012/091027 A1 | 7/2012 |
| WO | 2013/047744 A1 | 4/2013 |
| WO | 2013/047746 A1 | 4/2013 |
| WO | 2013/085755 A2 | 6/2013 |
| WO | 2013/106337 A1 | 7/2013 |
| WO | 2013/125505 A1 | 8/2013 |
| WO | 2014/067898 A1 | 5/2014 |
| WO | 2015/133972 A1 | 9/2015 |
| WO | 2015/195452 A2 | 12/2015 |
| WO | 2015/195453 A2 | 12/2015 |
| WO | 2015/200691 A1 | 12/2015 |
| WO | 2016/033546 A1 | 3/2016 |
| WO | 2016/033553 A1 | 3/2016 |
| WO | 2017/213892 A1 | 12/2017 |

OTHER PUBLICATIONS

U.S. Appl. No. 14/839,779, filed Aug. 28, 2015, Issued.
Extended European Search Report received for EP Application No. 15172144.6 dated Nov. 20, 2015, 20 pages.
Extended European Search Report received for European Patent Application No. 19163829.5, dated Jul. 24, 2019, 17 pages.
Extended European Search Report received for European Patent Application No. 20167074.2, dated Jun. 16, 2020, 18 pages.
Final Office Action received for U.S. Appl. No. 14/736,646, dated Sep. 7, 2017, 8 pages.
International Search Report and Written Opinion for International Application No. PCT/US2015/037780 dated Sep. 7, 2015, 12 pages.
International Search Report and Written Opinion for PCT Application No. PCT/US2015/035250 dated Dec. 14, 2015, 23 pages.
International Search Report and Written Opinion for PCT Application No. PCT/US2015/035251 dated Dec. 18, 2015, 15 pages.
International Search Report and Written Opinion for PCT Application No. PCT/US2017/034709 dated Aug. 3, 2017, 10 pages.
International Search Report and Written Opinion for PCT Application No. PCT/US2015/047574 dated Dec. 7, 2015, 10 pages.
International Search Report and Written Opinion for PCT Patent Application No. PCT/US2015/047585, dated Dec. 7, 2015, 9 pages.
Non-Final Office Action received for U.S. Appl. No. 14/839,852, dated Jul. 19, 2017, 10 pages.
Notice of Allowance received for U.S. Appl. No. 14/736,646, dated Oct. 23, 2018, 8 pages.
Notification Concerning Transmittal of International Preliminary Report on Patentability for International Application No. PCT/US2015/037780, dated Jan. 5, 2017.
Notification Concerning Transmittal of International Preliminary Report on Patentability for International Application No. PCT/US2015/047585, dated Mar. 9, 2017.
Partial European Search Report received for EP Application No. 15172146.1 dated Nov. 6, 2015, 8 pages.
Search Report received for Chinese Patent Application No. 201580000755.4, dated Mar. 24, 2017.
Non-Final Office Action received for U.S. Appl. No. 14/736,646, dated Mar. 15, 2018, 6 pages.
Final Office Action received for U.S. Appl. No. 14/839,779, dated Nov. 24, 2017, 8 pages.
Non Final Office Action received for U.S. Appl. No. 14/839,779, dated Apr. 2, 2018, 10 pages.
Non-Final Office Action received for U.S. Appl. No. 14/839,779, dated Jul. 20, 2017, 7 Pages.
Notice of Allowance received for U.S. Appl. No. 14/839,779, dated Oct. 24, 2018, 7 pages.
Non-Final Office Action received for U.S. Appl. No. 14/839,852, dated Feb. 13, 2018, 5 pages.
Non-Final Office Action received for U.S. Appl. No. 14/839,852, dated Jul. 27, 2018, 8 pages.
Search Report for Chinese Patent Application No. 201580000755.4 dated Oct. 27, 2016.
Casey et al., "Cadence Single-pass TFF Coupled with Chromatography Steps Enables Continuous Bioprocessing while Reducing Processing Times and Volumes", PALL, Life Science, Dec. 8, 2015, 8 pages.
Casey et al., "Protein Concentration with Single-Pass Tangential Flow Filtration (SPTFF)", Journal of Membrane Science vol. 384 (1), Sep. 10, 2011, pp. 82-88.
Casey, C. et al., "Cadence™ Single-pass TFF Coupled with Chromatography Steps Enables Continuous BioProcessing while Reducing Processing Times and Volumes", Application Note Jan. 2015, Jan. 2015.
Choo et al., "Membrane fouling mechanisms in the membrane-coupled anaerobic bioreactor", Water Research, vol. 30 No. 8, Aug. 1996, pp. 1771-1780.
Dizon-Maspat et al., "Single Pass Tangential Flow Filtration to Debottleneck Downstream Processing for Therapeutic Antibody Production", Biotechnology and Bioengineering, vol. 109 (4), Nov. 17, 2011, pp. 962-970.
Hu, "Ion Exchange Adsorption and Membrane Filtration Hybrid Process for Protein Mixture Separation", Journal of Chemical Engineering of Japan vol. 39(12), 2006, pp. 1283-1290.
Internet Blog, "Tangential Flow Filtration", Apr. 26, 2006, 3 pages.
Liu et al., "Recovery And Purification Process Development For Monoclonal Antibody Production", MAbs vol. 2 (5), Sep. 1, 2010, pp. 480-499.
Lutz Herb, "Ultrafiltration for Bioprocessing", 2015, pp. 77-94.
Mehta Ushma, "ChromaSorb™ Single-Use Membrane-Based Anion Exchanger", BioProcess International, Available online at: <https://bioprocessintl.com/2009/chromasorb-single-use-membrane-based-anion-exchanger-206589/>, 2009, 2 pages.
Merry A J. , "Membrane Equipment and Plant Design", Industrial Membrane Separation Technology, 1996, pp. 32-66.
Middlewood et al., "Extraction of Amaranth Starch from an Aqueous Medium using Microfiltration: Membrane Fouling and Cleaning", Journal of Membrane Science, Apr. 12, 2012, pp. 22-29.

(56) References Cited

OTHER PUBLICATIONS

Millipore Bioprocess Division, "Maintenance Procedures Pellicon and Pellicon 2 Cassette Filters", Jul. 1998, 20 pages.
Pall Corporation Brochure, "Cadence Single-Pass Tangential Flow Filtration Modules and Systems", 2014, 5 pages.
Notification Concerning Transmittal of International Preliminary Report on Patentability for International Application No. PCT/US2015/035250 dated Dec. 29, 2016.
Notification Concerning Transmittal of International Preliminary Report on Patentability for International Application No. PCT/US2015/035251, dated Dec. 29, 2016.
Notification Concerning Transmittal of International Preliminary Report on Patentability for International Application No. PCT/US2015/047574 dated Mar. 9, 2017.
Pellicon, "Pellicon Single-Pass TFF Cassette Retentate Collection Plate", Available online at: <https://www.emdmillipore.com/US/en/product/Pellicon-Single-Pass-TFF-Cassette-Retentate-Collection-Plate,MM_NF-XXSPTFF03>, 2 pages.
Rathore et al., "Recent Developments in Membrane-Based Separations In Biotechnology Processes: Review", Preparative Biochemistry and Biotechnology, vol. 41 (4), Oct. 2011, pp. 398-421.
Reis et al., "Linear Scale Ultrafiltration", Biotechnology and Bioengineering, vol. 55 (5), Sep. 5, 1997, pp. 737-746.
Schwartz Larry, "Diafiltration for Desalting or Buffer Exchange", BioProcess International, Available online at: <http://www.bioprocessintl.com/wp-content/uploads/bpi-content/0105ar06_77637a.pdf>, May 2003, 6 pages.
Steen et al., "Single Pass Tangential Flow Filtration", ACS mtg. poster, Anaheim, CA, Mar. 2011, 1 page.
Teske et al., "Inline Ultrafiltration", Biotechnology Progress, American chemical Society, vol. 26 (4), Mar. 1, 2010, pp. 1068-1072.
Zou et al., "New Technologies for high concentration protein ultrafiltration: High Viscosity TFF Cassettes and Single-Pass TFF", EMD Millipore, Oct. 2014, 1 page.
Non Final Office Action Received for U.S. Appl. No. 16/096,516, dated Jul. 21, 2022, 14 Pages.
European Office Action received for Patent Application No. 20167074.2 dated Mar. 25, 2022, 4 pages.
Office Action received for Japanese Patent Application No. 2020-081059 dated Mar. 29, 2022, 6 Pages (3 Pages of English Translation & 3 Pages of Official Copy).
Appeal Decision received for U.S. Appl. No. 16/207,874, dated Jun. 1, 2022, 7 Pages.
European Office Action received for Patent Application No. 17728414.8 dated Jan. 21, 2022, 4 pages.
Final Office Action received for U.S. Appl. No. 16/259,489 dated Mar. 22, 2022, 12 pages.
Notice of Allowance received for U.S. Appl. No. 16/207,874, dated Jan. 17, 2023, 5 Pages.
Membrane operations, Separation Processes, Retrieved from Internet URL:<https://web.archive.org/web/20041113003913/http://www.separationprocesses.com/Membrane/MT_Chp05j.htm>, Nov. 13, 2004, pp. 1-2.
Notice of Allowance received for U.S. Appl. No. 16/207,874, dated Sep. 7, 2022, 5 Pages.
Non Final Office Action Received for U.S. Appl. No. 16/259,489, dated Oct. 26, 2022, 18 Pages.
Non Final Office Action Received for U.S. Appl. No. 17/656,285, dated Oct. 14, 2022, 15 Pages.
Extended European Search Report received for European Patent Application No. 22174654.8 dated Aug. 3, 2022, 12 Pages.
Extended European Search Report received for European Patent Application No. 22200930.0, dated Feb. 3, 2023, 11 Pages.

SINGLE PASS TANGENTIAL FLOW FILTRATION SYSTEMS AND TANGENTIAL FLOW FILTRATION SYSTEMS WITH RECIRCULATION OF RETENTATE

RELATED APPLICATIONS

This application is a continuation of U.S. application Ser. No. 16/208,018, filed on Dec. 3, 2018, which is a divisional of U.S. application Ser. No. 14/839,779, filed on Aug. 28, 2015, now U.S. Pat. No. 10,195,550, issued on Feb. 5, 2019, which claims the benefit of U.S. Provisional Application No. 62/043,811, filed on Aug. 29, 2014. The entire teachings of the above applications are incorporated herein by reference.

BACKGROUND OF THE INVENTION

Tangential flow filtration (TFF) is a separation process that uses membranes to separate components in a liquid solution or suspension on the basis of size, molecular weight or other differences. Serializing the flow path of the liquid feed from one filtration module to the next in the TFF system can improve conversion by increasing fluid residence time in membrane modules. Traditional TFF processes typically rely on added TFF system components, such as diverter plates, to serialize the flow path of the liquid feed through the TFF system. Diverter plates, however, add cost and certain complexity to the system, and require additional operator training.

Accordingly, there is a need for improved TFF systems and processes that do not require diverter plates, or custom module assemblies, for effective serial processing of liquids. In addition, there is a present need for TFF systems and processes that include diafiltration using a serialized flow path to permit continuous flow and potentially more efficient bioprocessing at an industrial scale.

SUMMARY OF THE INVENTION

In one embodiment, the present invention relates to a method of filtering a liquid feed, comprising passing a liquid feed in a single pass mode through a single pass tangential flow filtration (SPTFF) system and recovering the retentate and permeate from the system in separate containers without recirculation through the SPTFF system, thereby filtering the liquid feed.

In one aspect of this embodiment, the SPTFF system comprises a plurality of filtration modules that are fluidly connected. Each of the filtration modules comprises a manifold segment that includes a first manifold for receiving and carrying the feed into the filtration module, a second manifold for receiving and carrying retentate out of the filtration module, and a third manifold for receiving and carrying permeate through the filtration module. The filtration modules are fluidly connected through the manifold segments to provide a serial flow path between filtration modules, by coupling of the first manifold in a manifold segment to the second manifold of a manifold segment in an adjacent module, such that the retentate of one module serves as the feed for the next module. The manifold segment in each module is also fluidly connected to a plurality of TFF cassettes that are stacked on one or both faces of the manifold segment. In addition, the SPTFF system comprises a feed inlet on the first module in the system and a retentate outlet on the last module in the system.

In another aspect of this embodiment, the SPTFF system consists of one filtration module. The filtration module comprises a feed inlet, a retentate outlet, a manifold segment that comprises a first manifold for receiving and carrying the feed into the filtration module, a second manifold for receiving and carrying retentate out of the filtration module, and a third manifold for receiving and carrying permeate through the filtration module, wherein the flow path through the manifold segment is serial, and a plurality of TFF cassettes that are stacked on one or both faces of, and are fluidly connected to, the manifold segment, wherein the liquid flow path is parallel through the cassettes.

In another embodiment, the invention relates to a method of filtering a liquid feed, comprising passing a liquid feed through a tangential flow filtration (TFF) system, recovering permeate and a portion of the retentate from the system in separate containers without recirculation through the TFF system, and recirculating the remainder of the retentate through the TFF system at least once, thereby filtering the liquid feed.

In one aspect of this embodiment, the TFF system comprises a plurality of filtration modules that are fluidly connected. Each of the filtration modules comprises a manifold segment that includes a first manifold for receiving and carrying the feed into the filtration module, a second manifold for receiving and carrying retentate out of the filtration module, and a third manifold for receiving and carrying permeate through the filtration module. The filtration modules are fluidly connected through the manifold segments to provide a serial flow path between filtration modules, by coupling of the first manifold in a manifold segment to the second manifold of a manifold segment in an adjacent module, such that the retentate of one module serves as the feed for the next module. The manifold segment in each module is also fluidly connected to a plurality of TFF cassettes that are stacked on one or both faces of the manifold segment. In addition, the TFF system comprises a feed inlet on the first module in the system, a retentate outlet on the last module in the system, a recirculation loop (e.g., a pump) for recirculating retentate through all or part of the system, and at least one conduit for recirculating retentate.

In another aspect of this embodiment, the TFF system consists of one filtration module. The filtration module comprises a feed inlet, a retentate outlet, a recirculation loop (e.g., a pump) for recirculating retentate through all or part of the system, at least one conduit for recirculating retentate, a manifold segment that comprises a first manifold for receiving and carrying the feed into the filtration module, a second manifold for receiving and carrying retentate out of the filtration module, and a third manifold for receiving and carrying permeate through the filtration module, wherein the flow path through the manifold segment is serial, and a plurality of TFF cassettes that are stacked on one or both faces of, and are fluidly connected to, the manifold segment, wherein the liquid flow path is parallel through the cassettes.

The processes described herein can be performed using SPTFF and TFF systems that lack diverter plates, thereby reducing the length of the flow path required to achieve effective serial processing and providing other advantages, such as improved flow distribution and multiplication of system size with a compact design and minimal external piping.

Figure 1:
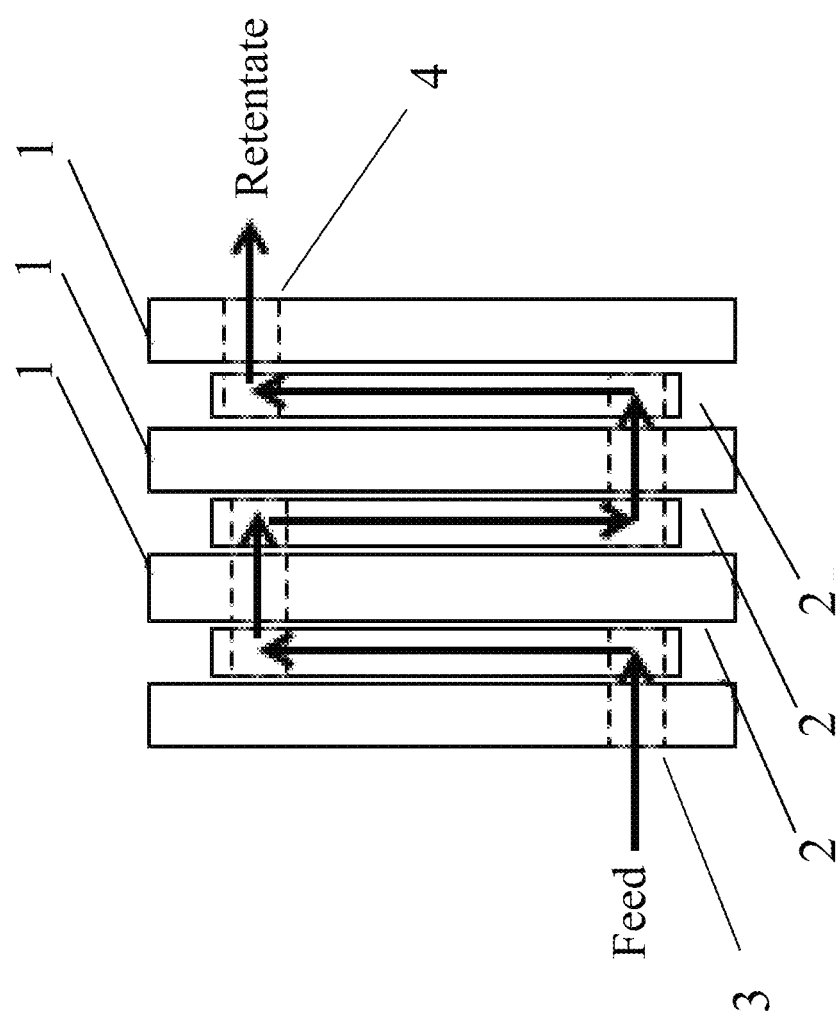
FIG. 1 is a diagram of a SPTFF system having diverter plates between cassettes to serialize the flow path.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Definitions

Unless defined otherwise, all technical and scientific terms used herein have the same meaning as commonly understood by one of ordinary skill in the art to which this invention pertains.

"SPTFF assembly," "SPTFF system" and "SPTFF apparatus" are used interchangeably herein to refer to a single pass tangential flow filtration system that is configured for operation in a single-pass mode, where the fluid passes once through the system.

"TFF assembly," "TFF system" and "TFF apparatus" are used interchangeably herein to refer to a tangential flow filtration system that is configured for operation in a recirculation mode where at least a portion of the retentate is returned to the system as feed.

The terms "feed," "feed sample" and "feed stream" refer to the solution that is delivered (e.g., continuously, as a batch) to a filtration module to be filtered. The feed that is delivered to a filtration module for filtration can be, for example, feed from a feed container (e.g., vessel, tank) external to the system, or retentate from a preceding filtration module in the same system (e.g., in SPTFF and TFF systems operated in serial processing mode).

The term "filtration" generally refers to the act of separating the feed sample into two streams, a permeate and a retentate, using membranes.

The terms "permeate" and "filtrate" refer to that portion of the feed that has permeated through the membrane.

The term "retentate" refers to the portion of the solution that has been retained by the membrane, and the retentate is the stream enriched in a retained species.

"Feed line" or "feed channel" refers to a conduit for conveying a feed from a feed source (e.g., a feed container) to one or more processing units in a filtration assembly (e.g., a SPTFF or TFF system).

"Retentate line" or "retentate channel" refers to a conduit in a filtration assembly for carrying retentate.

"Permeate line" or "permeate channel" refers to a conduit in a filtration assembly for carrying permeate.

The expression "flow path" refers to a channel supporting the flow of a liquid (e.g., feed, retentate, permeate) through all or part of a SPTFF or TFF system. Thus, an SPTFF and a TFF system can have multiple flow paths, including a flow path through the entire system from the feed inlet to the retentate outlet, a flow path within a filtration module (e.g., a flow path through TFF cassettes and/or a manifold segment in a filtration module) and a flow path between two or more adjacent filtration modules (e.g., a flow path between manifold segments in adjacent filtration modules). The flow path can have any topology which supports tangential flow (e.g., straight, coiled, arranged in zigzag fashion). The flow path can be parallel or serial. A flow path can also refer to a path resulting in a single pass through an SPTFF system or a path for recirculating retentate through a TFF system. Furthermore, a flow path can be open, as in an example of channels formed by hollow fiber membranes, or have one or more flow obstructions, as in the case, for example, of rectangular channels formed by flat-sheet membranes spaced apart by woven or non-woven spacers.

A "filtration module" refers to a unit in an SPTFF or a TFF system comprising a manifold segment and one or more TFF cassettes.

A "manifold segment" refers to a block having a plurality of manifolds, including a manifold for carrying a feed, a manifold for carrying a retentate and a manifold for carrying a permeate.

A "TFF cassette" or "cassette" refers to a plate-and-frame structure comprising a filtration membrane (e.g., an ultrafiltration membrane, a microfiltration membrane) and separate feed/retentate and permeate flow channels suitable for SPTFF and TFF processes.

"Filtration membrane" refers to a selectively permeable membrane for separating a feed into a permeate stream and a retentate stream using an SPTFF or a TFF process. Filtration membranes include, but are not limited to, ultrafiltration (UF) membranes, microfiltration (MF) membranes, reverse osmosis (RO) membranes and nanofiltration (NF) membranes.

The terms "ultrafiltration membrane" and "UF membrane" are used herein to refer to a membrane that has pore sizes in the range of between about 1 nanometer to about 100 nanometers.

The term "microfiltration membranes" and "MF membranes" are used herein to refer to membranes that have pore sizes in the range between about 0.1 micrometers to about 10 micrometers.

The term "plurality," when used herein to describe processing units, refers to two or more processing units.

"Fluidly connected" refers to two or more components of an SPTFF or a TFF system (e.g., two or more manifold segments, two or more TFF cassettes, a manifold segment and one or more TFF cassettes), that are connected by one or more conduits (e.g., a feed channel, a retentate channel, a permeate channel) such that a liquid can flow from one component to the other.

"Product" refers to a target compound in a feed. Typically, a product will be a biomolecule (e.g., protein) of interest, such as a monoclonal antibody (mAb).

"Processing" refers to the act of filtering (e.g., by SPTFF or TFF) a feed containing a product of interest and subsequently recovering the product in a concentrated form. The concentrated product can be recovered from the filtration system (e.g., an SPTFF or a TFF system) in either the retentate stream or permeate stream depending on the product's size and the pore size of the filtration membrane.

The expressions "parallel processing", "processing in parallel", "parallel operation" and "operation in parallel" refer to distributing a liquid in an SPFTT or a TFF system to two or more filtration units (e.g., filtration modules, TFF cassettes) in the assembly concurrently, or in rapid succession, for subsequent tangential flow filtration.

The expressions "serial processing", "processing in series", "serial operation" and "operation in series" refer to distributing a liquid in an SPTFF or a TFF system to one filtration unit (e.g., filtration module, TFF cassette) at a time, such that the retentate flow of a preceding unit serves as the feed flow for a subsequent, adjacent unit.

The expressions "conversion" and "conversion per pass" are used herein to denote the fraction of the feed volume that permeates through the membrane in a pass through the flow channels, expressed as a percentage of the feed stream volume.

The term "residence time" refers to holdup volume on the feed side of the membrane divided by flow rate.

The term "single-pass TFF mode" refers to operating conditions for a TFF system under which the retentate is not recirculated through the system.

Advantages of SPTFF and TFF Systems of the Invention

Traditional SPTFF processes typically rely on added system components, such as diverter plates, to serialize the flow path of the liquid feed through the SPTFF system. For example, FIG. 1 shows an SPTFF system having diverter plates 1 between TFF cassettes 2 to serialize the flow path (indicated by arrows). Dashed lines show the locations of conduits for feed and retentate flow. Feed enters at the left through a feed inlet 3 and exits at the right unit through a retentate outlet 4.

Figure 2:
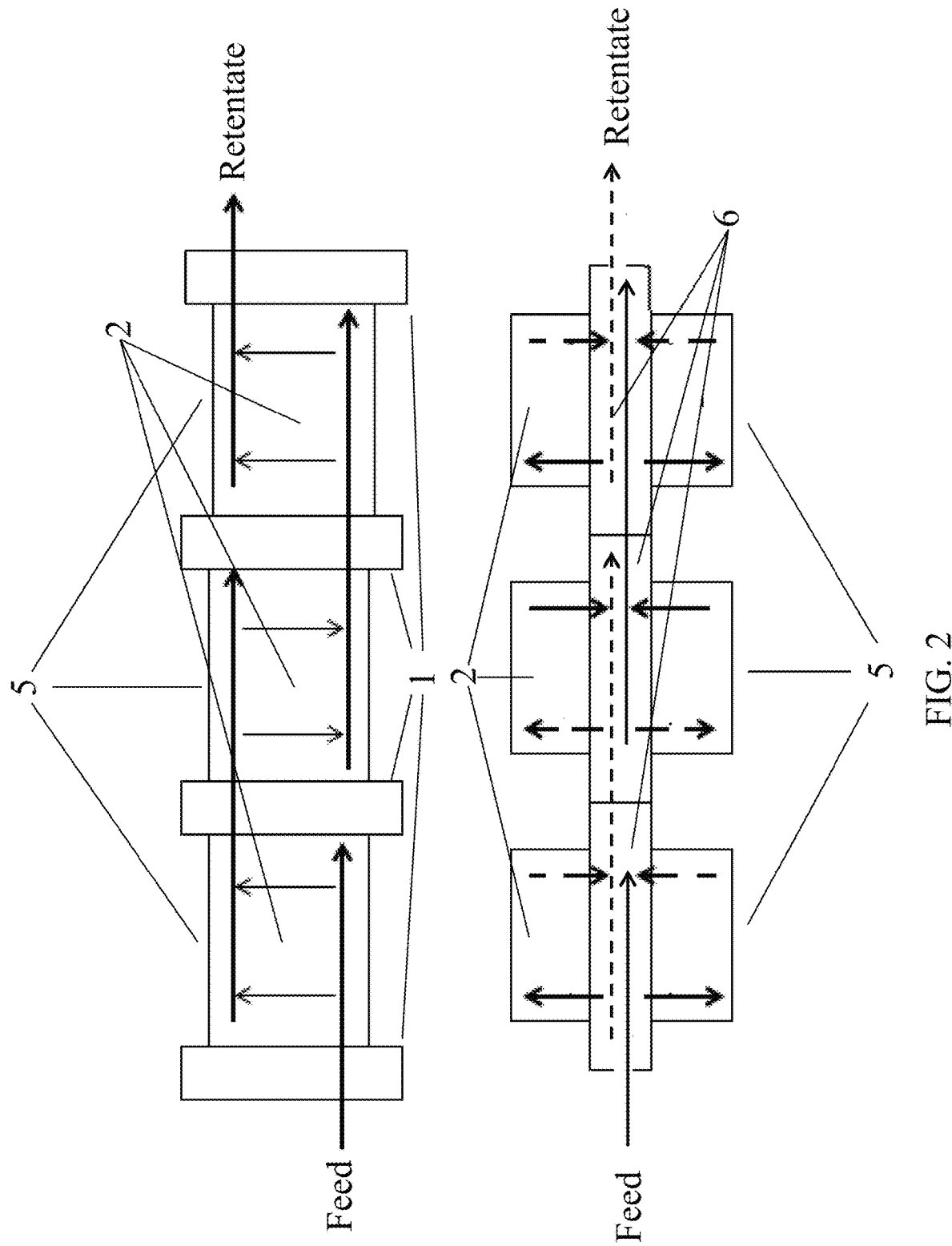
FIG. 2 is diagram comparing a SPTFF system having diverter plates to serialize the flow path through three filtration modules (top) with a SPTFF system that relies on manifold arrangements (not shown) in the manifold segments to serialize the flow path through three filtration modules in the absence of diverter plates (bottom).

In contrast, the methods described herein, also referred to as the "methods of the invention" can be performed using an SPTFF system or a TFF system that comprises manifold segments to serialize the flow path of the feed and retentate without requiring diverter plates (see FIG. 2, lower diagram). FIG. 2 shows a comparison of an SPTFF system having diverter plates 1 to serialize the flow path through three filtration modules 5 (upper diagram) with an SPTFF system that relies on manifold arrangements (not shown) in the manifold segments 6 to serialize the flow path through three filtration modules 5 in the absence of diverter plates (lower diagram). Both SPTFF systems have a total filtration area of 30 m$^2$ (10 m$^2$ per module). In the upper diagram, the horizontal arrows depict diverter plate and cassette manifold flow paths and the vertical arrows depict the tangential flow path through the cassettes. In the lower diagram, the horizontal arrows depict conduit flow paths where the dotted lines are background and the solid lines are foreground. The vertical arrows depict the flow path through the cassette manifold. Tangential flow in the cassettes is into or out of the page.

As can be seen in the diagrams shown in FIG. 2, SPTFF systems employing diverter plates generally require a longer cassette manifold flow path option (shown in FIG. 2 as the horizontal lines through each filtration module in the diverter plate option (top diagram) and as vertical lines through each filtration module in the manifold segment (bottom diagram)), increased system size and/or external piping to achieve effective serial processing (compare upper and lower diagrams in FIG. 2), all of which can adversely impact flow distribution and conversion. See also FIG. 7 for a detailed illustration of the flow path on one side of the manifold.

In contrast, the SPTFF and TFF systems described herein do not require diverter plates. Rather, the SPTFF and TFF systems disclosed herein include manifold segments that can be fluidly connected, or coupled, to TFF cassettes on both faces of the manifold segment in each filtration module (see FIG. 2, lower diagram). When TFF cassettes are stacked in parallel on both faces of the manifold segment, the flow path length through each stack of parallel cassettes can be reduced about 50%, which can improve flow distribution through the filtration module. Furthermore, stacking the manifold segments themselves allows for multiplication of system size while maintaining a compact design and requiring only minimal external piping. In addition, the feed and retentate conduits in each manifold segment can be reduced at each level of the system as flow is reduced due to increased conversion (in contrast to systems utilizing diverter plates, in which the manifold size is fixed by the cassette-hole dimensions).

Single-Pass Tangential Flow Filtration (SPTFF) Systems and Methods of the Invention In one embodiment, the invention relates to a method of filtering a liquid feed comprising passing a liquid feed through a single pass tangential flow filtration (SPTFF) system and recovering the retentate and permeate from the system in separate containers.

The liquid feed can be any liquid (e.g., a biological liquid) that contains particles (e.g., viral particles, host cell proteins) to be filtered. For example, the liquid feed can contain a target molecule of interest (e.g., a target protein, such as a recombinant protein) and one or more impurities (e.g., non-target proteins). Typically, the liquid feed is obtained from a source of the target molecule (e.g., a hybridoma or other host cell expressing a monoclonal antibody (MAb)). In a particular embodiment, the target molecule in the liquid feed is a MAb and the non-target molecules are host cell proteins (HCPs) (e.g., proteins from host hybridoma cells). Non-target proteins are generally a heterogeneous mixture of proteins of varying sizes, hydrophobicities and charge densities. In another embodiment, the liquid feed contains one or more viruses (e.g., for virus filtration processes). In yet another embodiment, the liquid feed includes plasma products.

Operating an SPTFF system in single-pass mode allows direct flow-through concentration of a product (e.g., target protein) in the absence of recirculation, which reduces overall system size through elimination of mechanical components and permits continuous operation at high conversion levels. Thus, single-pass TFF (SPTFF) systems and processes provide several advantages over traditional recirculating TFF systems and processes.

In general, SPTFF systems that are useful for the present invention can be assembled and operated using standard, existing TFF system components that are well known and are commercially available. Standard TFF system components include, for example, TFF cassettes comprising filtration membranes, cassette holders, conduits (e.g., tubing, piping) for feed, retentate and permeate, a housing or enclosure, valves, gaskets, a pump module (e.g., pump module comprising a pump housing, diaphragm and check valve) one or more reservoirs (e.g., process containers for feed, retentate and permeate) and a pressure gauge.

In accordance with the invention, the liquid feed is passed (e.g., pumped) through an SPTFF system that comprises at least one filtration module. In general, each filtration module comprises a manifold segment that includes a first manifold for receiving and carrying the feed into the filtration module, a second manifold for receiving and carrying retentate out of the filtration module, and a third manifold for receiving and carrying permeate through the filtration module. The manifold segment is fluidly connected to a plurality of TFF cassettes that are stacked on one or both faces of the manifold segment. When the SPTFF system contains only one filtration module, that module comprises both a feed inlet and retentate outlet, whereas, in systems comprising a plurality of filtration modules, the feed inlet is on the first filtration module in the system (e.g., the module that first receives the feed directly through a channel comprising the feed pump) and the retentate outlet is on the final, or last, filtration module in the system In a particular embodiment, the SPTFF system contains only one filtration module. In another embodiment, the SPTFF system contains a plurality of filtration modules.

Each manifold segment has a manifold structure, or arrangement, that permits the segment to be fluidly connected to manifold segments in adjacent filtration modules. The manifold segments are connected in a manner that promotes a serial flow path from manifold segment to manifold segment. For example, adjacent manifold segments are arranged such that the first manifold in each manifold segment is connected to the second manifold of an adjacent manifold segment. As a result of this arrangement, the retentate of one module (which exits the module through the second manifold in the manifold segment) serves as the feed for the next module (which is received in the first manifold of the manifold segment). A third manifold in the manifold segment provides a separate path for discharging the permeate from the filtration modules.

The manifolds in the manifold segments in a SPTFF system can have identical diameters, or different diameters, from manifold segment to manifold segment. For example, the diameter of the manifolds can be progressively smaller from manifold segment to manifold segment. Decreasing manifold diameter through series helps maintain fluid velocity for flush and cleaning through the different sections as fluid is lost to the permeate in each section. This may also aid in removing air, increasing maximum concentration factor, and increasing product recovery and/or reducing product dilution. In particular embodiments, each manifold segment has manifolds having the same diameter from one end to the next (e.g., the manifolds are not tapered). In other embodiments, the manifolds can be tapered.

Figure 3:
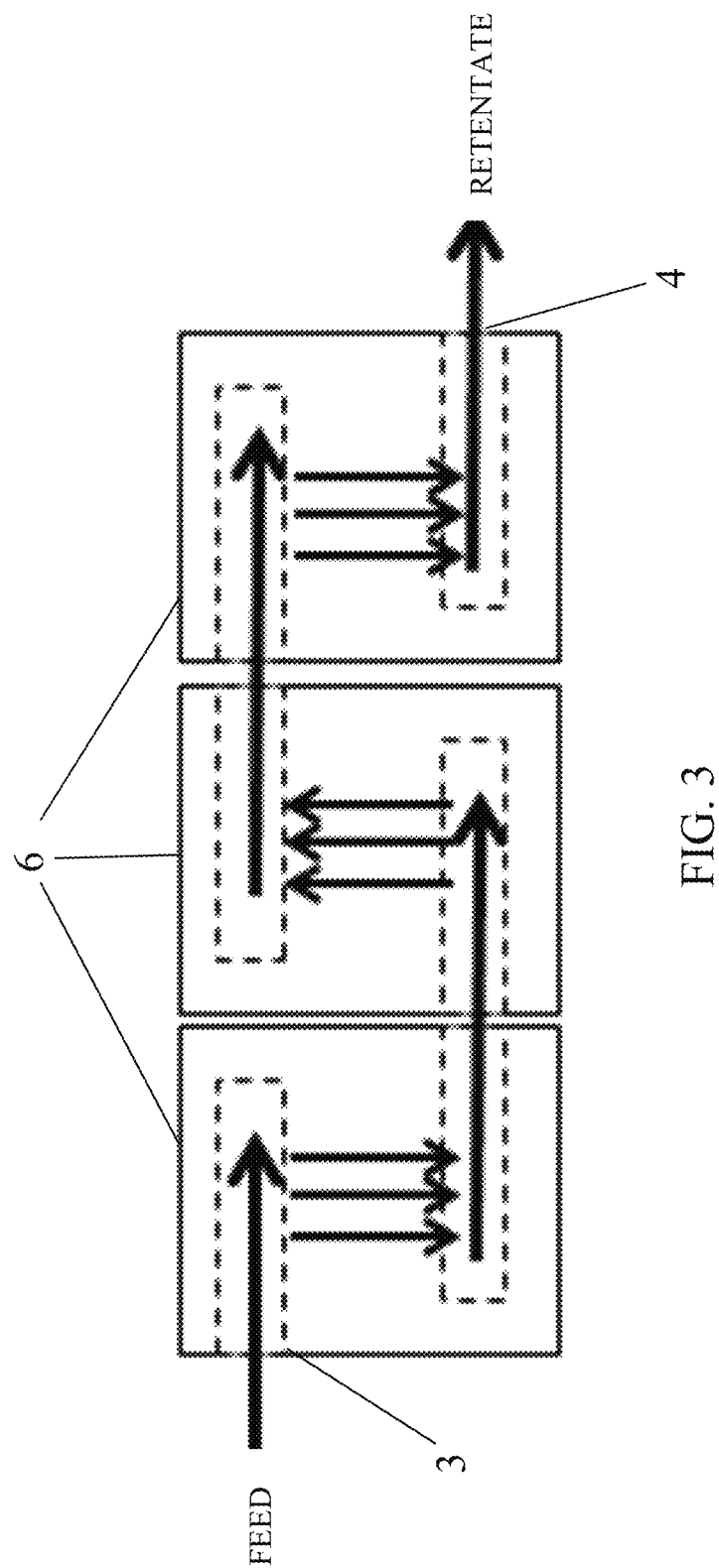
FIG. 3 is a diagram of a SPTFF system with three filtration modules having a manifold arrangement designed to serialize feed flow.

FIG. 3 is a cross-section diagram of a SPTFF system showing fluidly-connected manifold segments 6 from three adjacent filtration modules. Vertical arrows indicate the direction of the flow path through parallel cassettes (not shown) that are stacked on the sides of the manifold segments 6 and project into and out of the page. Horizontal arrows indicate the direction of the flow path between manifold segments 6, which have a manifold arrangement (dashed lines) designed to serialize feed flow. Feed enters the system at the left through a feed inlet 3 and exits at the right through a retentate outlet 4. The permeate path is not shown for simplicity.

In one embodiment, parallel flow between adjacent manifold segments can be prevented by the use of manifold segments that do not have fully-bored manifolds for carrying feed and retentate (see, for example, the manifolds depicted in FIG. 3). For example, manifold segments with first and second manifolds that do not extend through the entire manifold segment can be used to prevent parallel flow of feed and retentate, respectively, between adjacent manifold segments to facilitate a serial flow path between modules. Typically, such manifold segments will contain a separate third manifold for carrying permeate that does extend the entire length of the segment for carrying permeate to adjacent segments.

In an alternative embodiment to the one shown in FIG. 3, parallel flow between adjacent manifold segments is prevented using seals or valves (e.g., sanitary valves) to facilitate a serial flow path between modules. For example, seals or valves can be positioned in the manifolds that carry feed and retentate to block liquid from flowing in a parallel fashion into adjacent manifold segments. The use of seals or valves to prevent parallel flow is particularly desirable when the manifold segments are fully bored, such that the first, second and third manifolds each extend completely through the manifold segment.

Suitable seals (e.g., mechanical seals) for placement in manifolds include, but are not limited to, rings (e.g., o-rings, metal rings), molding, packing, sealants and gaskets. Preferably, the seal is a gasket, such as, for example, a gasket that closes off an opening or a gasket having a length sufficient to closes off any dead volume between the opening and a first passage in a manifold. Preferably, the gasket is flexible and sanitary (e.g., a gasket that is non-shedding, cleanable, sanitizable, and has low extractables). The gasket can include an elastomeric material or metal (e.g., a metal foil). An exemplary gasket is part #A84MP-G from Newman Gasket Co., Lebanon, Ohio.

The use of valves instead of seals provides greater operational flexibility by permitting parallel flow between manifold segments when the valves are open, and serial flow when the valves are closed. Suitable valves for use in manifolds include, for example, pinch valves (e.g., diaphragm valve). Preferably, the valve is low shear and sanitary (e.g., compatible, non-toxic, sanitizable, non-shedding). As used herein, a "sanitary valve" is a valve that can maintain a sterile connection regardless of whether the valve is open or closed. Typically, a sanitary valve will be compatible, non-toxic, sanitizable and non-shedding.

Examples of manifold segments that can be used in the processes described herein are disclosed in U.S. Pat. No. 5,147,542, the contents of which are incorporated herein by reference.

The manifold segment in each filtration module is also fluidly connected to one or more TFF cassettes (e.g., one or more separate TFF cassettes, one or more TFF cassettes packaged in a single cassette holder). For example, the manifold segment can be fluidly connected to TFF cassettes through a flow channel that extends from the first, or feed, manifold in the manifold segment through the plurality of TFF cassettes, and a retentate flow channel that extends through the plurality of TFF cassettes back to the second, or retentate, channel in the manifold segment.

The TFF cassettes can be located (e.g., stacked) on one or both faces of the manifold segment. Typically, each filtration module can accommodate up to about 10 $m^2$ of filtration membrane area on each face of the manifold segment for a total of about 20 $m^2$ of area per filtration module. Thus, in some embodiments, the total filtration area of a filtration module is about 20 $m^2$ or less, such as, for example, about 10 $m^2$, about 5 $m^2$, about 2 $m^2$, about 1 $m^2$, about 0.5 $m^2$ or about 0.1 $m^2$ of filtration membrane area. Accordingly the number of cassettes that can be stacked on each side of the manifold segment depends on the membrane area of the particular cassette (see, e.g., Table 1). Preferably, the filtration modules in an SPTFF system each contain the same number and arrangement of TFF cassettes.

TABLE 1

Exemplary Numbers of Particular EMD Millipore TFF Cassettes Suitable for the SPTFF and TFF Systems Described Herein

| Cassettes | | | | | |
|---|---|---|---|---|---|
| Cassette type | area($m^2$) | Number of cassettes/side of manifold segment | Number of cassettes/level of TFF system | Holder Levels/Stacked Filtration Modules | Area ($m^2$) 4 levels |
| Pellicon ® 2 (EMD Millipore) | | | | | |
| EMD          P2B030A25 | 2.5 | 1 to 4 | 1 to 8 | 1 to 6 | 80 |
| Millipore    P2C030C25 | 2.5 | 1 to 4 | 1 to 8 | 1 to 6 | 80 |
| Catalogue    P2C030V25 | 2.0 | 1 to 4 | 1 to 8 | 1 to 6 | 64 |
| Number       P2GVPPC25 | 2.5 | 1 to 4 | 1 to 8 | 1 to 6 | 80 |
|              P2B030A05 | 0.5 | 20 | 40 | 1 to 6 | 80 |
| Pellicon ® 3 (EMD Millipore) | | | | | |
| EMD          P3C030C10 | 1.14 | 10 | 20 | 1 to 6 | |
| Catalogue Number | | | | | |
| Millipore    P3C030D10 | 1.14 | 10 | 20 | 1 to 6 | 91.2 |

In one embodiment, TFF cassettes (e.g., about 1, 2, 3, 4, 5, 6, 7, 8, 9, 10 or more TFF cassettes) are located on both faces of the manifold segment. In another embodiment, TFF cassettes (e.g., about 1, 2, 3, 4, 5, 6, 7, 8, 9, 10 or more TFF cassettes) are located on only one face of the manifold segment. When TFF cassettes are located on both faces of a manifold segment, the number of TFF cassettes on each face of the manifold segment can differ or be the same. Preferably, the total number of TFF cassettes on each face of the manifold segment is identical.

The cassettes used in SPTFF processes can be configured to be processed in series, in parallel or both. Processing in series can improve conversion by increasing mass transfer through operation at lower feed flow rates. Although processing the cassettes in series can improve SPTFF performance and product recovery, parallel processing is often preferred for flushing SPTFF assemblies with liquids to remove preservative or storage solution, measure permeability, equilibrate the membranes, clean the membranes, or prepare the membranes for storage, particularly because serial processing requires additional time and material (e.g., water, buffer, cleaning solutions, storage solutions), which increases the overall cost of operation compared to parallel processing.

Figure 4:
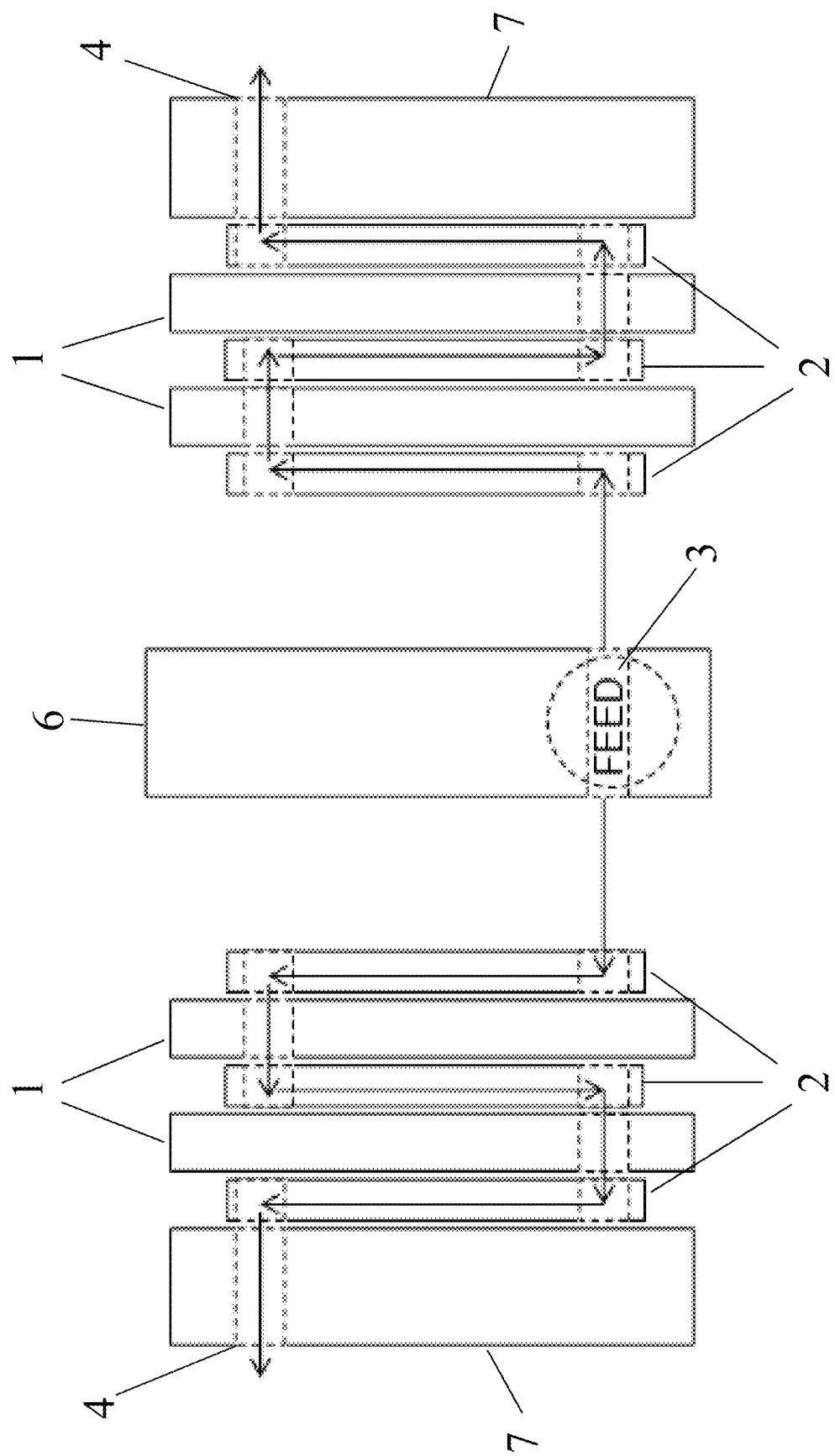
FIG. 4 is diagram depicting a top view of a single level in a SPTFF system that includes diverter plates.

In the methods described herein, the TFF cassettes in the filtration modules are typically configured for processing in parallel (e.g., the cassettes lack diverter plates). However, in some embodiments, the TFF cassettes can be configured for processing in series (e.g., using diverter plates). For example, FIG. 4 is diagram depicting a top view of a single level in an SPTFF system that includes diverter plates 1. A central manifold segment/block 6 comprising a feed inlet 3 is fluidly connected to three TFF cassettes 2 on each of the two sides/faces of the block. Diverter plates 1 between the first and second, and second and third, cassettes 2 on each side ensure a serial flow path through the cassettes. End plates 7 after the third cassette on each side contain retentate outlets 4. Arrows show the direction of the flow path through the system. Dashed lines show the locations of conduits for feed and retentate flow.

In other embodiments, the TFF cassettes can be configured for operation in parallel mode and in series mode. For example, one or more valves (e.g., sanitary valves) can be positioned on the feed and retentate channels between TFF cassettes to reversibly stop the flow between adjacent cassettes, allowing for the cassettes to be processed in parallel when the valves are open, or in series when the valves are closed. For example, the valves can be attached to the cassettes directly or positioned on tubing or piping between adjacent cassettes.

Figure 5:
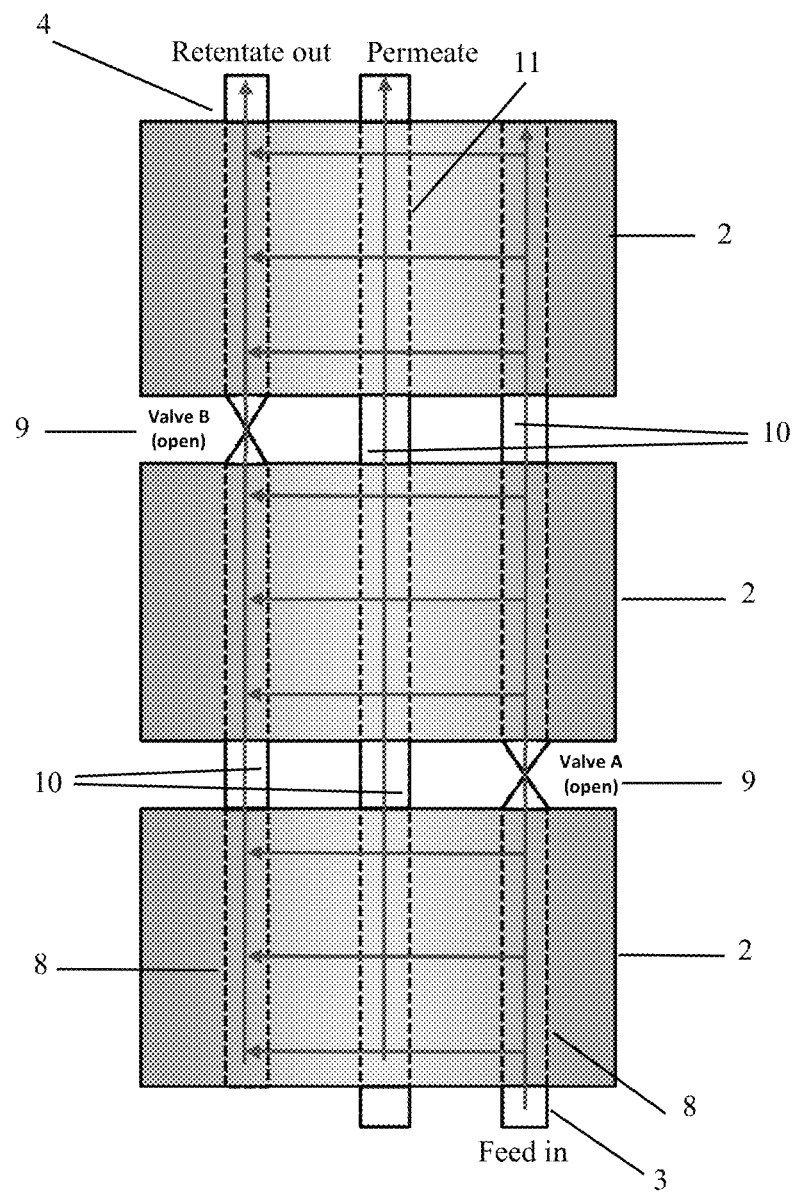
FIG. 5 is a diagram depicting a SPTFF system with open valves on the flow channels between TFF cassettes for parallel processing.

FIG. 5 depicts three TFF cassettes 2 that are fluidly connected through flow channels 8 for feed and retentate. A first valve 9 is located on a flow channel 8 between the bottom and middle cassettes, and a second valve 9 is located on a flow channel between the middle and top cassettes. Valve-less spool pieces 10 are also positioned on the feed and retentate flow channels 8, and on a permeate flow channel 11, between cassettes. Feed enters the cassettes through a feed inlet 3 and exits the cassettes through a retentate outlet 4. The valves 9 in the diagram are open to allow for parallel processing of the cassettes 2 (e.g., for flushing or cleaning the assembly). When the valves 9 are both closed, the cassettes 2 are processed serially (e.g., for product processing and recovery).

Figure 6:
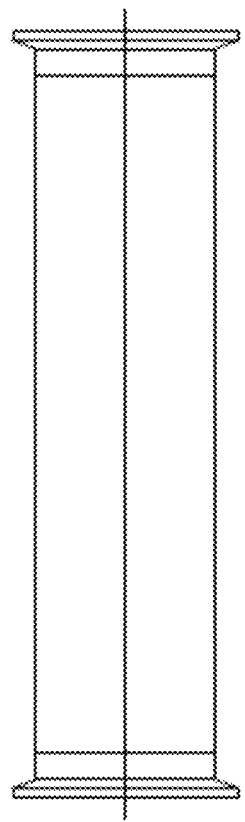
FIG. 6 is a diagram of an exemplary spool piece for placement between TFF cassettes that can be processed in parallel or serially.

In general, the spool piece is an open conduit with sanitary ends that connects the retentate channel from one process holder to the feed channel of the following process holder, or connects the permeates channels of adjacent process holders. Preferably, the length of the spool piece is chosen to match that of the sanitary valve so the assembly has a balanced height. An exemplary spool piece is depicted in FIG. 6. The spool piece in FIG. 6 includes an open cylindrical body capable of acting as a fluid conduit with a flange located at each end.

In further embodiments, the SPTFF systems can include one or more filtration modules with cassettes that are configured for processing in parallel, and one or more filtration modules with cassettes that are configured for processing in series (e.g., using valves, gaskets or diverter plates). Preferably, the filtration modules with cassettes that are configured for processing in parallel precede the filtration modules having cassettes that are configured for processing in series in the SPTFF system. In a particular embodiment, all of the filtration modules in an SPTFF system have cassettes that are configured for processing in parallel, except for the last, or final, filtration module, which has cassettes arranged for processing in series (e.g., using diverter plates) (see, e.g., FIG. 4).

Exemplary TFF cassettes that are useful for the methods described herein include, but are not limited to, TFF cassettes supplied by EMD Millipore Corporation (Billerica, Mass.), such as, for example, Pellicon® cassettes (e.g., Pellicon® 2 cassettes, Pellicon® 2 Mini cassettes, Pellicon® 2 Maxi cassettes, Pellicon® 3 cassettes) with Biomax™ membrane, Ultracel™ membrane or Durapore® membrane. Other examples of TFF cassettes that can be used in the methods described herein include, for example, Centrasette™ cassettes and Cadence™ single-use cassettes (Pall Corporation, Port Washington, N.Y.), Kvick™ Flow cassettes (GE Healthcare Bio-Sciences, Piscataway, N.J.) and Hydrosart® cassettes (Sartorius AG, Bohemia, N.Y.).

An end plate or cassette holder is generally used to hold, or seal, the TFF cassettes in the filtration module. The end plates and cassette holders can be fitted for use with particular cassettes. Examples of commercially-available end plates and cassette holders that are suitable for use in the SPTFF systems employed in the methods described herein include, but are not limited to, Pellicon® cassette holders (EMD Millipore Corporation, Billerica, Mass.) such as, for example, Pellicon® 2 miniholders, acrylic Pellicon® holders, stainless steel Pellicon® holders, process scale Pellicon® holders. Other suitable cassette holders include, but are not limited to, Centramate™ TFF membrane cassette holders, Centrasette™ TFF membrane cassette holders, Maximate™ TFF membrane cassette holders and Maxisette™ TFF membrane cassette holders (Pall Corporation, Port Washington, N.Y.). In some embodiments, existing cassette holders (e.g., Pellicon® cassette holders (EMD Millipore Corporation)) can be modified to function in the SPTFF systems described herein for use in the methods of the invention.

Preferably, the filtration modules in the SPTFF system are stacked (e.g., in a vertical stack) to form levels, wherein each level comprises a single filtration module. For example, the system can include about 2, 3, 4, 5 or more stacked filtration modules. At process scale (e.g., using Pellicon®-3 cassettes (EMD Millipore)), the SPTFF system typically contains about 5 stacked filtration modules (e.g., a 5-level system), with each filtration module preferably having an effective filtration area of about 20 m² per module.

Figure 7:
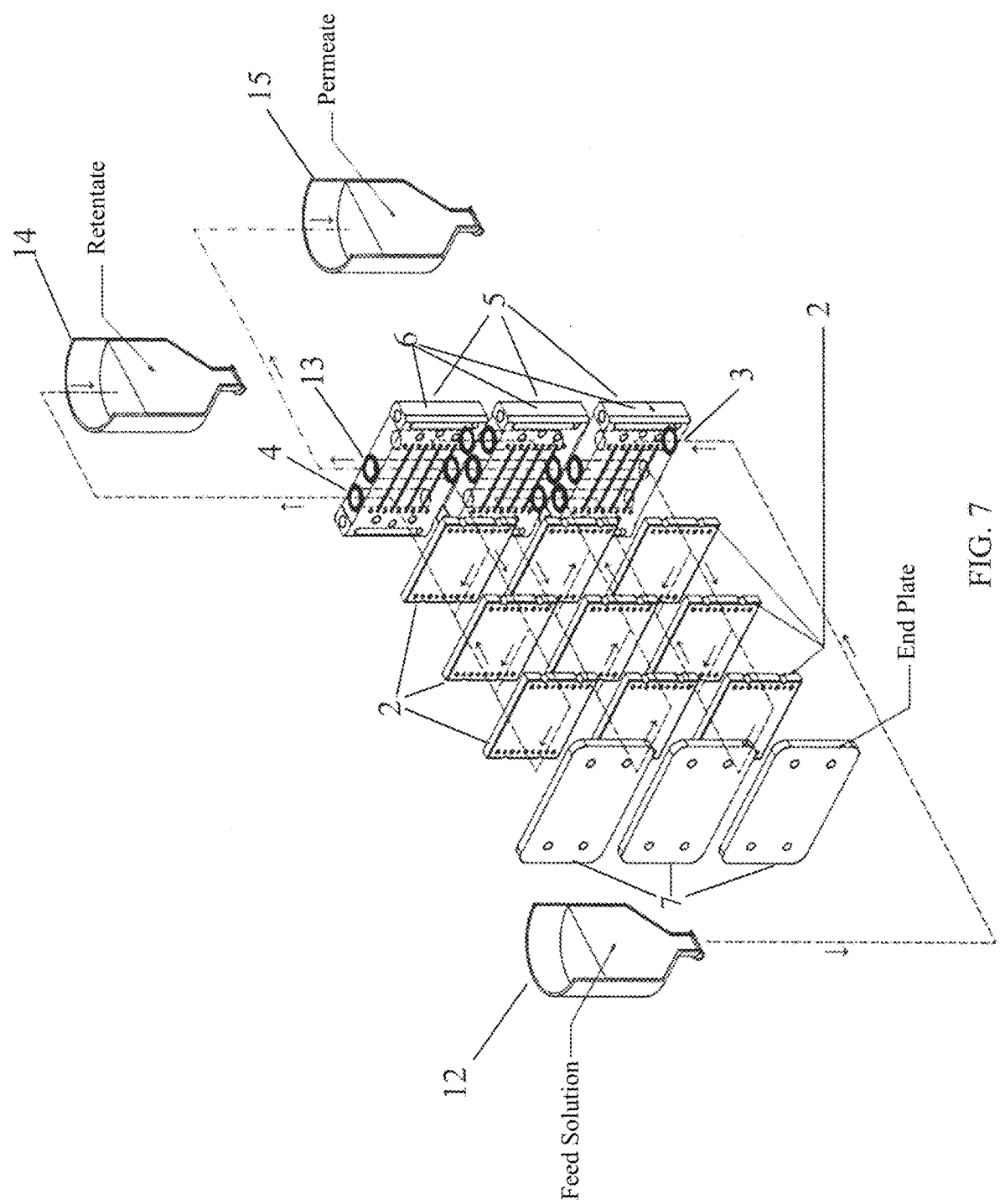
FIG. 7 is a diagram showing an isometric view of a SPTFF system having three vertically-stacked filtration modules that are processed in series as a result of the manifold arrangements in the manifold segments.

FIG. 7 is a diagram showing an isometric view of an SPTFF system having three vertically-stacked filtration modules 5 that are processed in series as a result of the arrangement of the manifolds (shown as cylinders) in the manifold segments 6. Heavy black circles show points where fluid enters or exits a manifold. Three parallel TFF cassettes 2 are shown projecting from the left side of each manifold segment 6 in each of the three filtration modules 5 and being held in place by an end plate 7. Feed solution is pumped from the feed container 12 into the SPTFF system through a feed inlet 3 on the manifold segment 6 of the bottom module 5. Retentate and permeate exits the system through retentate 4 and permeate outlets 13, respectively, on the manifold segment 6 of the top module 5 before being collected in receptacles for retentate 14 and permeate 15. Arrows indicate the direction of the flow path (dashed line), which is parallel through the cassettes in each module and serial through the manifold segments.

The SPTFF systems used in the methods described herein also typically include a feed inlet and retentate outlet. In general, the feed inlet is positioned on the first filtration module in the SPTFF system, and is connected on one end to a conduit (e.g., pipe, tube) that is connected to the feed tank and is connected on the other end to the first manifold in the manifold segment in the first module to receive feed into the system. The retentate outlet is typically positioned on the last, or final, filtration module in the SPTFF system, and is connected on one end to the second manifold in the manifold segment in the last module and is connected on the other end to a conduit (e.g., pipe, channel) that is connected to a retentate container.

SPTFF systems useful for performing the methods described herein can further contain one or more additional components useful for performing SPTFF processes including, but not limited to, the following, examples of which are known in the art: one or more sampling ports, a T-line (e.g., for in-line buffer addition), a pressure sensor, a diaphragm for a pressure sensor, a valve sensor to indicate whether any valves in the system are open or closed, and a flow meter. In a particular embodiment, the SPTFF system includes a sampling port (e.g., sanitary sampling port) at one or more locations in the system. For example, sampling ports can be included at the end of the retentate line, the permeate line, or both. Typically, the sampling port will be located on the manifold segment in a filtration module. In one embodiment, the SPTFF system lacks diverter plates.

In some embodiments, one or more components of the SPTFF system can be disposable. Disposable TFF system components are well known and are available commercially. The disposable components are typically made from disposable materials (e.g., plastic, rubber, metal), preferably plastic. Exemplary disposable components for SPTFF assemblies include, but are not limited to, components of Flexware® assemblies for Mobius® FlexReady Solution for TFF (EMD Millipore Corporation, Billerica, Mass.). Other disposable components for SPTFF assemblies include, for example, components of Allegro™ TFF assemblies (Pall Corporation, Port Washington, N.Y.).

TFF Systems of the Invention with Recirculation of the Retentate

In contrast to SPTFF systems of the invention where the liquid feed passes once through the system, the TFF systems of the invention operate by recirculating at least a portion of the retentate back to feed. Accordingly, an embodiment of the invention relates to a method of filtering a liquid feed, comprising passing a liquid feed through a tangential flow filtration (TFF) system, recovering permeate and a portion of the retentate from the system in separate containers without recirculation through the TFF system, and recirculating the remainder of the retentate through the TFF system at least once. Retentate is recirculated during operation of the entire filtration process or at certain times during operation of the filtration process. For example, recirculating all or a portion of the retentate during start up provides a method by which to ensure that system has reached equilibrium and the retentate has achieved the desired concentration prior to collecting it into the product vessel. It also provides a convenient way to respond to system upsets during processing to provide a more robust process. The fraction of retentate that is recirculated can be adjusted via modulation of the pump or control valve as a way to tune the system in order to assure consistent retentate concentration and/or consistent retentate flow rate to the product collection vessel every run even if feedstock protein concentration, new membrane permeability, membrane fouling, membrane permeability, or membrane mass transfer or pressure drop varies from batch to batch. This strategy has particular benefits in the context of continuous processing where the success of subsequent operations relies on the output of a previous operation. Recirculation of retentate can improve cleaning effectiveness through increased cross flow velocity and reduce cleaning solution through recirculation. The TFF systems employed in the TFF methods of the invention involving recirculation additionally include at least one pump or control valve for recirculating retentate through all or part of the system and at least one conduit for recirculating (e.g., carrying) retentate.

Typically, at least about 50% of the retentate is collected after a single pass, while the remainder of the retentate is recirculated. Preferably, about 10% or less (e.g., about 0.5%, about 1%, about 2%, about 5%, about 10%) of the retentate is recirculated after the first pass through the TFF system.

The amount of retentate that is recirculated can be controlled using, for example, a pump or a valve. A flow meter can be used to provide a process value for the pump or valve to control the amount of retentate that is recirculated. Preferably, the valve or pump and/or flow meter is/are positioned on the retentate outlet or flow line carrying retentate out of the system to the retentate receptacle.

The retentate that is being recirculated can be returned to any upstream location in or before the TFF system. In one embodiment, the retentate is recirculated to the feed tank. In another embodiment, the retentate is recirculated to the feed line near the feed pump before the feed inlet on the TFF system.

Figure 8:
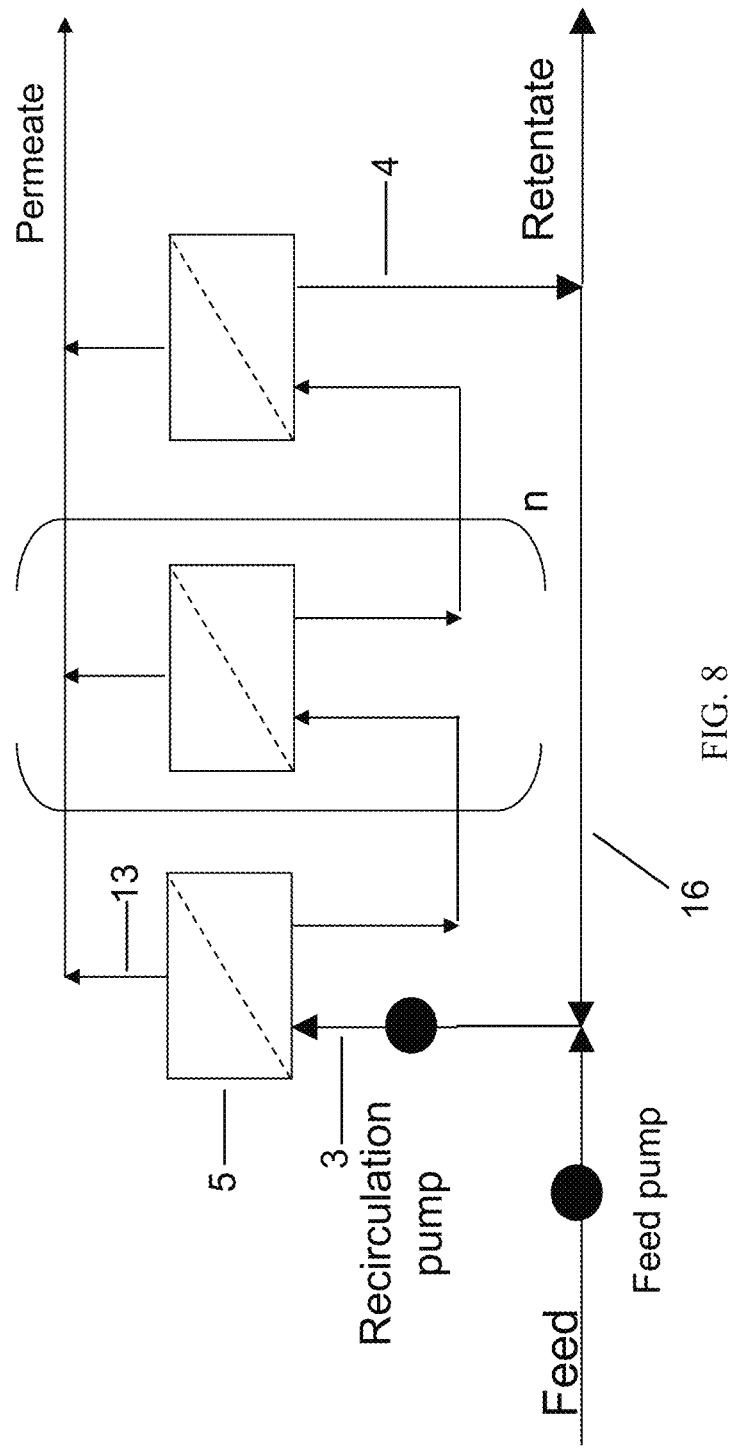
FIG. 8 is an example TFF system configured for recirculation of at least a portion of the retentate; n represents the number of filter modules (n=0 to 8).

An example TFF system configured for recirculation of the retentate is shown in FIG. 8, where the number of filtration modules 5 arranged in series can differ depending upon system design. Feed enters the system at the left through a feed inlet 3 and a portion of the retentate is recirculated back to feed through recirculation line 16. Retentate and permeate exits the system through retentate 4 and permeate outlets 13. In an alternative configuration (not shown), the recirculation pump can be in the retentate recirculation line 16.

The systems and methods described herein with regard to SPTFF are applicable to TFF systems and methods.

SPTFF and TFF Systems of the Invention Employing Diafiltration

In some embodiments, the methods described herein further comprise performing diafiltration (e.g., to remove or lower the concentration of salts or solvents in the liquid feed, or to accomplish buffer exchange). In a preferred embodiment, the diafiltration is performed by concentrating the liquid feed (e.g., by SPTFF or TFF) to reduce the diafiltration volume and then restoring the feed to its starting volume by adding diafiltration solution, a process which is known in the art as discontinuous, or batch, diafiltration. In another embodiment, diafiltration is performed by adding the diafiltrate solution to retentate to increase the diafiltration volume followed by concentrating the sample to restore it to its original volume. In yet another embodiment, the diafiltration is performed by adding the diafiltration solution to unfiltered feed at the same rate that permeate is removed from the SPTFF or the TFF system, a process which is known in the art as continuous, or constant-volume, diafiltration. Continuous countercurrent diafiltration can be performed with the TFF systems and methods of the invention. Suitable diafiltration solutions are well known and include, for example, water and various aqueous buffer solutions.

To perform diafiltration, the TFF system can include a reservoir or container for diafiltration solution and one or more conduits for carrying diafiltration solution from the diafiltration solution container to the liquid feed tank.

Figure 9:
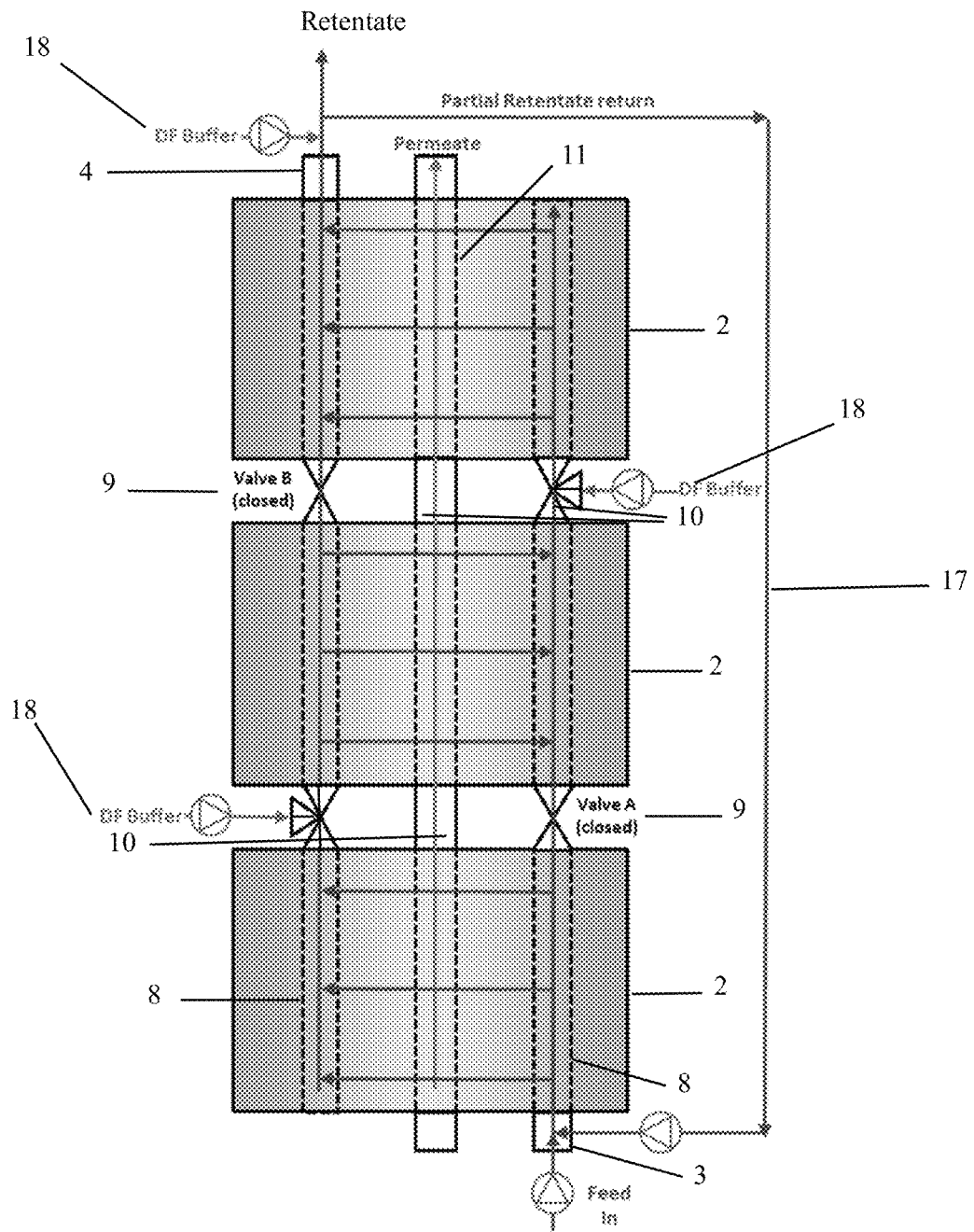
FIG. 9 is an example TFF system configured for continuous diafiltration and partial retentate recirculation.

To avoid extremes of concentration and in-line dilution as part of the diafiltration process (e.g., >90%), it is preferred to inject the diafiltrate into multiple sections of the filtration assembly to restore the flow in the retentate section to the same flow as in the initial feed. This requires matching the rate of diafiltrate buffer addition with the rate of permeate removal. A preferred method is to use a single pump with multiple pump heads containing the diafiltrate addition and permeate removal flow lines (e.g., peristaltic pump from Ismatec, Glattbrugg Switzerland). Each pump head will have closely-matched pumping rates so this process will be balanced and maintain efficient buffer exchange. It is recommended to match flows for each of the multiple sections by using pumps containing up to 24 channels. The diafiltrate can be injected into the retentate ports in manifolds or separator plates. FIG. 9 shows an exemplary configuration of three TFF modules with a loop 17 for partial retentate recirculation and potential entry points for diafiltration (DF) buffer 18. In addition, a segmented permeate manifold (not shown) could be introduced to enable countercurrent diafiltration. Countercurrent diafiltration is a well-known concept in the art (see, for example, H. Lutz, Ultrafiltration for Bioprocessing, 2015, p. 93). In an alternative embodiment (not shown in FIG. 9), retentate recycle can return to a point before the feed pump or other method for pressurizing the feed, such as directing the retentate recycle to the feed tank.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of filtering a liquid feed, comprising:
a) passing a liquid feed through a tangential flow filtration (TFF) system that comprises:
a plurality of stacked filtration modules that are fluidly connected, each filtration module comprising:
a single manifold segment comprising a first manifold for receiving and carrying the feed into the filtration module, a second manifold for receiving and carrying retentate out of the filtration module, and a third manifold for receiving and carrying permeate through the filtration module; and
a plurality of TFF cassettes that are stacked on one or both faces of, and are fluidly connected to, the manifold segment, wherein the manifold segments are stacked and the manifolds in the manifold segments are coupled to create a centralized serial flow path through the system for feed and retentate;
a feed inlet on the first filtration module in the system;
a retentate outlet on the last filtration module in the system;
the TFF system having a liquid flow path that is parallel through the cassettes in each filtration module and serial through the manifold segments in adjacent filtration modules by coupling the first manifold in each manifold segment to the second manifold of an adjacent manifold segment, such that the retentate of one module serves as the feed for the manifold segment of the next filtration module, except that the first manifold in the first manifold segment of the filtration module in the system is connected to the feed inlet and the second manifold in the manifold segment of the last filtration module in the system is connected to the retentate outlet and wherein diverter plates are explicitly excluded;

b) recovering permeate in a permeate container and recovering a portion of the retentate from the system in a retentate container without recirculation of the recovered retentate through the TFF system.

2. The method of claim 1, wherein about 10% or less of the retentate exiting the TFF system is recirculated.

3. The method of claim 1, wherein the TFF system includes a valve or flow meter that is positioned on the retentate outlet or conduit carrying retentate from the system to the retentate container to control the amount of retentate that is recirculated.

4. The method of claim 1, wherein retentate is recirculated back to a feed container in the TFF system or back to a feed line after a feed pump in the TFF system.

5. The method of claim 1, wherein the first and second manifolds in the manifold segment contain a seal or a valve.

6. The method of claim 1, wherein each filtration module contains one or more TFF cassettes on one or both faces of the manifold segment.

7. The method of claim 1, wherein the filtration area for each filtration module is about 20 $m^2$ or less.

8. The method of claim 1, wherein at least one filtration module further comprise valves on the flow channels between the TFF cassettes, wherein the cassettes are processed in parallel when the valves are open, or in series when the valves are closed.

9. The method of claim 1, further comprising adding a diafiltration step, wherein the diafiltration step includes 10 concentration and dilution steps.

10. The method of claim 1, wherein the TFF system further comprises one or more of: sampling port, a T-line for in-line buffer addition, a pressure sensor, a diaphragm for a pressure sensor, a reservoir for diafiltration solution, and a conduit for delivering diafiltration to a feed reservoir.

11. The method of claim 1, wherein the filtration modules can have the same or different filtration areas from each other.

12. The method of claim 1, wherein the manifolds in the single manifold segment have the same diameter throughout the filtration system or the manifolds in the single manifold segment have progressively smaller diameters from single manifold segment to single manifold segment.

13. The method of claim 7, wherein the filtration area for each filtration module is selected from about 10 $m^2$, about 1.0 $m^2$ or about 0.1 $m^2$.

* * * * *